Patented Nov. 19, 1929

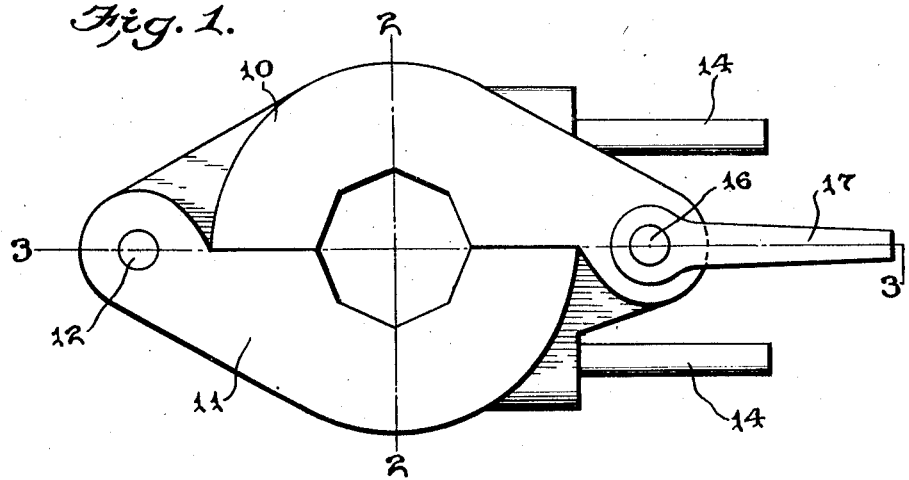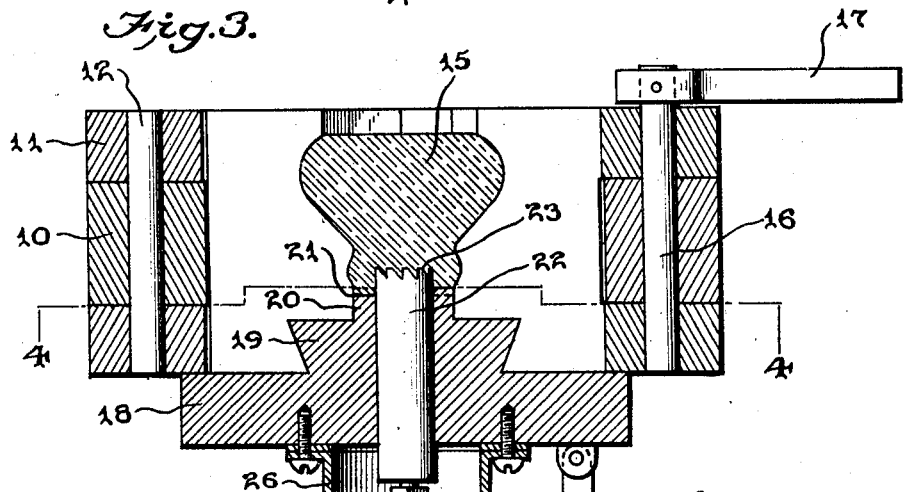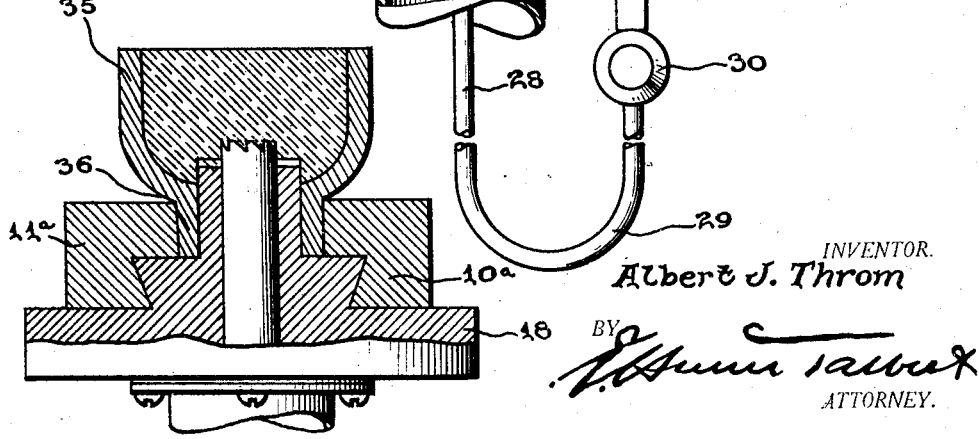

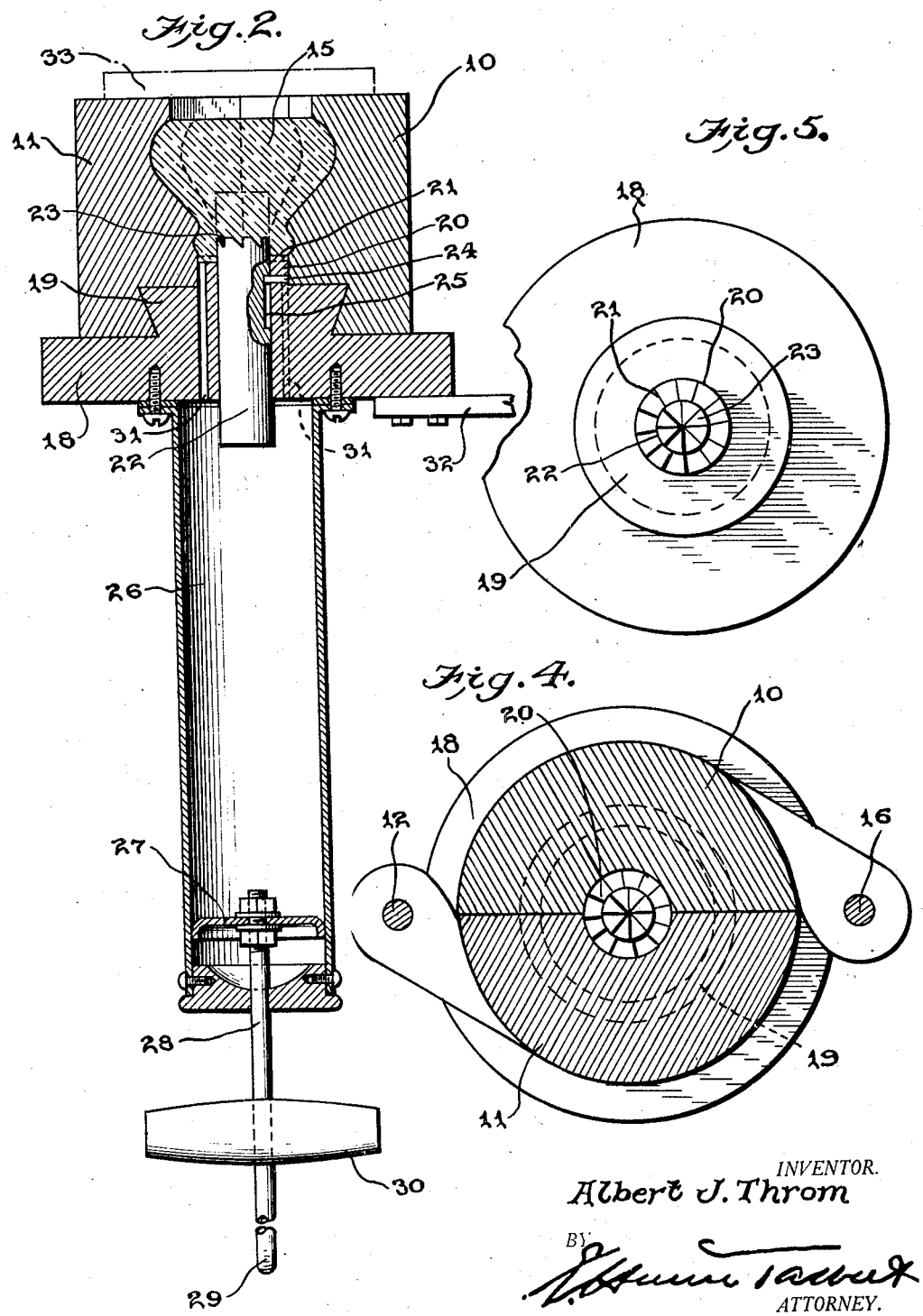

1,736,637

UNITED STATES PATENT OFFICE

ALBERT J. THROM, OF JEANNETTE, PENNSYLVANIA

GLASS MOLD

Application filed December 3, 1927. Serial No. 237,449.

The object of the invention is to provide a mold in which articles of glass may be cast in such a manner that the air pressure above the molten glass in the mold will be forced to all parts of the latter to effect the formation of a perfect article; to provide a mold which will so form the articles that the finishing process after casting may be reduced to a minimum; to provide a mold particularly adapted for the formation of glass door knobs in which the star usually in the top wall of the socket is completed by the pressure of a die or plunger after the glass has been partially chilled; and to provide a mold which is of simple form and therefore susceptible of cheap manufacture.

With this object in view, the invention consists in a construction and combination of parts of which a preferred embodiment is illustrated in the accompanying drawings, wherein:

Figure 1 is a top plan view of the invention.

Figures 2 and 3 are respectively vertical sectional views on the planes indicated by the lines 2—2 and 3—3 of Figure 1.

Figure 4 is a horizontal sectional view on the plane indicated by the line 4—4 of Figure 3.

Figure 5 is a top plan view of the base member.

Figure 6 is a central vertical sectional view of a modified form of the invention in which the conventional shell is employed.

The invention is illustrated as a mold for door knobs and the mold proper comprises the complemental sections 10 and 11 pivotally connected by a hinge pin 12, each section being provided with a tang 14 for engagement with a wooden handle to swing the two sections toward and away from each other. The mold cavity in which the crystal article 15 is cast is formed half in one mold section and half in the other and when the two sections are together, which is their operative position, they are retained in such position by means of a lock pin 16 which, at the upper end, carries a tang 17 for connection with a detachable wooden handle.

The mold sections are supported on a base plate 18 formed with a central boss 19, the latter being of inverted frusto-conical form to engage in corresponding recesses on the under face of the mold sections, so that when the sections are in operative position, the mold proper becomes locked to the base member. The boss 19 on the upper face and centrally of the latter is formed with an annular upstanding flange 20 toothed around its upper edge as indicated at 21, which teeth serve to form the corrugations in the bottom face of the knob and bounding the socket formed therein. A plunger 22 forms the socket and on its upper end the teeth 23 are formed, these for the purpose of forming the star in the upper wall of the socket of the cast article. The plunger is capable of slight longitudinal movement but is precluded from turning or angular movement by means of a pin 24 which traverses an axial slot 25 in the plunger, the pin being inserted radially through the annular flange 20 and entering the slot. While precluding angular movement of the plunger, the pin also determines the length of axial movement by engagement with the opposite ends of the slot 25.

The plunger extends down through the base plate 18 into the upper end of a pump barrel 26 which is secured to the under face of the base plate in pendent position from the latter. A piston 27 is disposed in the barrel and connected with a piston rod 28, the latter being provided with a return bend 29 and carrying at its extremity a handle 30. Communication between the article-forming cavity and the barrel is provided by means of ducts 31 extending through the base plate 18 and the boss 19.

The mold is designed for support beyond the edge of a table or bench and this may be accomplished in any acceptable form, such as by a bracket 32 connected with the base member and extending on to the bench or table for connection therewith.

In the operation of the casting, the mold is locked to the base member by closing the sections 10 and 11 with their recesses engaging the boss 19, the lock pin 16 being then inserted. The plunger 22 drops by gravity until the upper end of the slot 25 engages the pin 24. The molten glass is then poured into the cavity, the piston 27 having been raised by means of the handle 30. The lowering of the piston through the instrumentality of the handle then extracts any air in the mold below the molten glass, the air passing out through the ducts 31. The air pressure above then forces the glass into all parts of the mold cavity, an ordinary plate of metal 33 then being laid on top of the mold above the cavity. As the glass begins to chill, the piston 27 is raised by means of the handle 30 and abutting the lower end of the plunger 22 raises the latter and the star on the top of the knob socket is thus clearly formed by the teeth on the upper end of the plunger.

To provide against the piston elevating the plunger in the initial operation, any acceptable means may be provided. In the illustrated embodiment, a swinging stop 34 is carried on the under face of the base member 18 and the handle 30 abuts this stop preventing engagement of the piston with the plunger in the lower position of the latter. Thus with the stop 34 in obstructing relation to the handle, the piston may be elevated just to the point where it will not engage the plunger. It thus may be held in this position while the glass is being poured into the mold and depressed after the mold is filled. In the setting of the star in the top of the socket, the stop 34 is merely swung out of position which will enable the raising of the handle a sufficient distance to engage the piston with the plunger and elevate the latter.

In the modification shown in Figure 6, the mold sections 10ª and 11ª are substantially identical with the sections 10 and 11 but of reduced height as compared with the latter. This modified form of mold is connected with the base member 18 in the same way as in the previously described form but the body of the cast article is formed in a shell 35, flanged as at 36 to sit in a socket formed half in each of the mold members 10ª and 11ª.

In the one form, the cast article is removed by the separation of the mold members after the removal of the locking pin 16 and this plan may be followed with that form of the invention illustrated in Figure 6, although it is possible, where the shell is used, to simply lift out the shell and remove the cast article from it.

The invention having been described, what is claimed as new and useful is:

1. A mold of the kind specified having an article-forming cavity, a base member on which the mold is mounted, a plunger movable in the base member, a pump carried by the base member and in communication with said cavity, the pump having a piston for the extraction of air from said cavity and for the actuation of said plunger.

2. A mold for the purpose indicated comprising hingedly connected complemental sections, the mold having an article-forming cavity formed jointly in the two sections, a base member having an interlocking connection with said sections, a plunger slidably mounted in the base member and entering the cavity at the bottom, a pump barrel carried by the base member and in communication with the cavity, and a piston movable in the barrel for the extraction of air from the cavity upon movement in one direction and the actuation of the plunger when moved in the other direction.

3. A mold for the purpose indicated comprising hingedly connected complemental sections, the mold having an article-forming cavity formed jointly in the two sections, a base member having an interlocking connection with said sections, a plunger slidably mounted in the base member and entering the cavity at the bottom, a pump barrel carried by the base member and in communication with the cavity, a piston movable in the barrel for the extraction of air from the cavity upon movement in one direction and the actuation of the plunger when moved in the other direction, and selective means to permit actuation of the piston with or without actuation of the plunger.

In testimony whereof he affixes his signature.

ALBERT J. THROM.